Jan. 19, 1926. 1,569,916
H. H. FISHER ET AL
SYSTEM OF WATER TRANSPORTATION AND A NOVEL
BOAT FOR USE IN CONNECTION THEREWITH
Filed Dec. 11, 1922 2 Sheets-Sheet 1
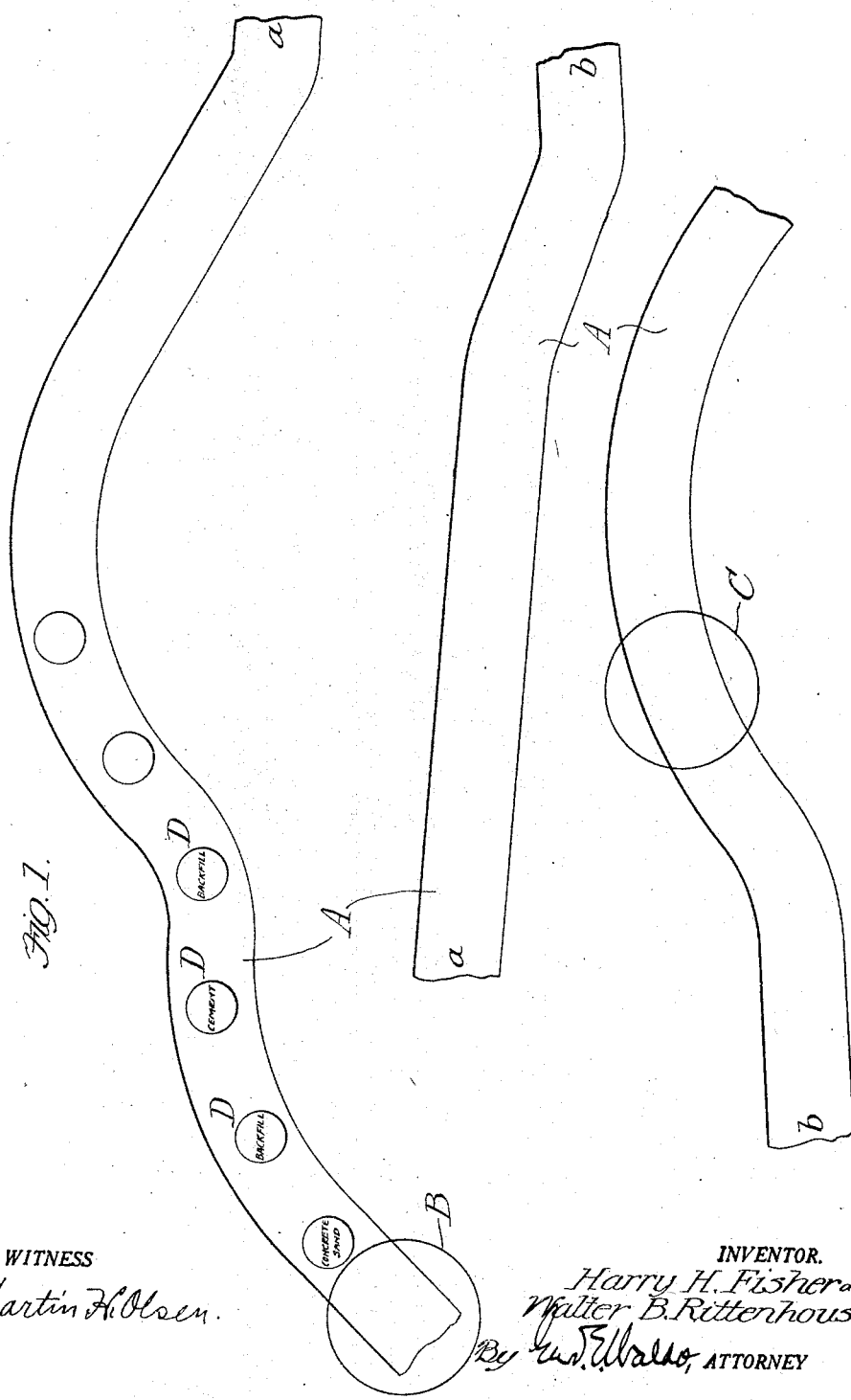
WITNESS
Martin H. Olsen.
INVENTOR.
Harry H. Fisher and
Walter B. Rittenhouse
By W. E. Waldo, ATTORNEY

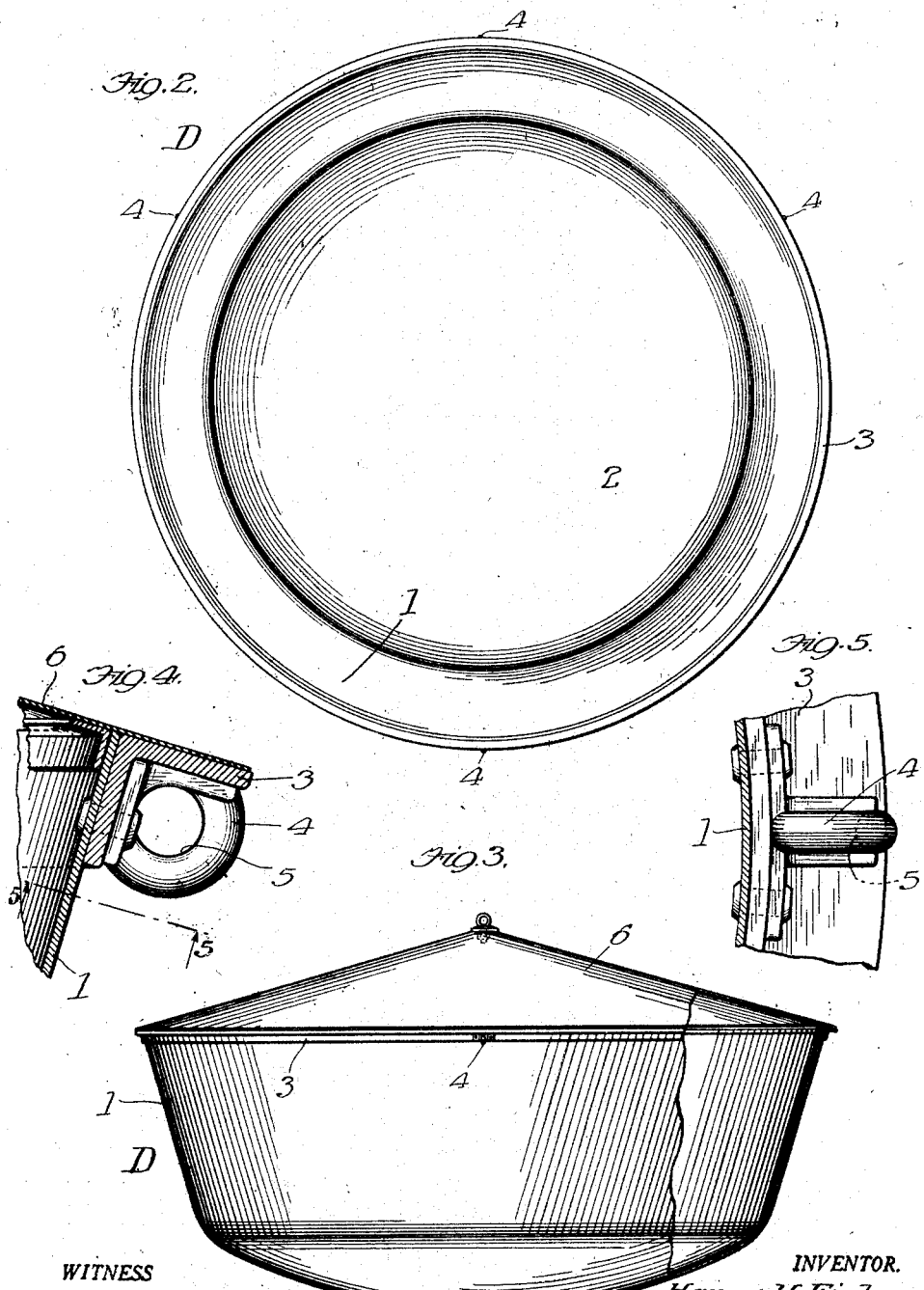

Patented Jan. 19, 1926.

1,569,916

UNITED STATES PATENT OFFICE.

HARRY H. FISHER AND WALTER B. RITTENHOUSE, OF CHICAGO, ILLINOIS, ASSIGNORS TO BYLLESBY ENGINEERING AND MANAGEMENT CORPORATION, OF WILMINGTON, DELAWARE, A CORPORATION OF DELAWARE.

SYSTEM OF WATER TRANSPORTATION AND A NOVEL BOAT FOR USE IN CONNECTION THEREWITH.

Application filed December 11, 1922. Serial No. 606,201.

*To all whom it may concern:*

Be it known that we, HARRY H. FISHER and WALTER B. RITTENHOUSE, citizens of the United States, and residents of Chicago, in the county of Cook and State of Illinois, have invented a certain new and useful System of Water Transportation and a Novel Boat for Use in Connection Therewith, of which the following is a specification.

This invention relates to an improved system of water transportation, and to a novel boat for use in carrying out said system.

As the invention relates to a system of water transportation, the object of the invention is to provide such a system particularly designed and adapted for transporting materials from an up-stream loading point on an artificial water-course, as an irrigation ditch or canal, to a down-stream point of discharge, utilizing the current flow in said water-course as a motive force for impelling the loaded boats.

To effect the object of the invention as it relates to the art of water transportation, our improved system consists broadly in depositing a suitable boat in the water-course at an up-stream loading point, loading said boat, permitting it to float down stream to a point of discharge impelled by the current flow in said water-course, lifting said boat together with its contents, bodily from the water, dumping the material at a desired point of deposit, and returning the empty boat to the up-stream loading point, by means of a suitable vehicle, which may be either a land or water vehicle.

In practice, our improved system of transportation contemplates the use of a plurality of boats, a sufficient number thereof being provided to insure an adequate and steady supply of materials at destination.

In order that our improved system of transportation may be conducted economically, our invention contemplates permitting the loaded boats to float down the water-course without guidance, and practically without attention of any kind on the part of the operatives, until they arrive at destination or point of discharge, and to render this feasible and practicable, the boats used in carrying on our improved system are so devised and constructed that, in case they become stranded or encounter an obstruction, which might stop them, they will execute a turning or rolling movement about a vertical axis, which will tend to release them and permit them to continue their progress down-stream.

Said boats having been discharged at destination, our invention contemplates loading them upon a suitable vehicle, as a motor truck or tractor trailer, and returning them to the up-stream loading point. Said trucks are designed to carry several boats at a load and, in order to economize space, said boats are shaped to "nest" one within another, but without wedging together.

As our invention relates to a novel form of boat, the object of the invention is to provide a boat adapted for use in carrying out our improved system and, to this end, a boat embodying our invention, is made tub or bowl-shaped, being preferably stamped or pressed from sheet metal of suitable thickness to provide requisite strength, No. 12 gauge sheet steel being desirable for most purposes; said boat being substantially circular in top plan view; the sides thereof being upwardly and outwardly flared; the bottom outwardly and downwardly convex; and its upper edge being reinforced and strengthened by means of what may be designated a chime, spot-welded or otherwise rigidly secured thereto.

Also, to provide for conveniently making hoisting connections to said boats, they are provided, adjacent to their upper edges, with lugs provided with eyes adapted for engagement by hooks attached to the chains or cables of suitable hoisting apparatus.

A boat of our invention also comprises the various other features, combination of features and details of construction hereinafter described and claimed.

In the accompanying drawings, in which our invention is fully illustrated,

Figure 1 is a diagrammatic view illustrating the manner of carrying out our improved system of water transportation.

Figure 2 is a top plan view of a boat adapted for use in the practice of our improved system of water transportation, the cover thereof being removed.

Figure 3 is a side view thereof partly in sections, with a cover applied thereto.

Figure 4 is an enlarged fragmentary detail sectional view; and

Figure 5 is a view from the position 5 in Fig. 4.

Though capable of general use where conditions are favorable our improved system of transportation, and also the boats used in carrying out said system, were particularly designed for use in transporting material of various kinds to be used in lining irrigation and other ditches or canals with concrete, in accordance with the process and apparatus which forms the subject-matter of an application for U. S. Letters Patent therefor, heretofore filed by us in the U. S. Patent Office on the 17th day of July, 1922, Sl. No. 575,467, to which reference is made as exemplifying a definite application of our improved process.

Referring now to the drawings A designates an irrigation or other ditch or canal which, for example, is to be lined with concrete in accordance with the process of our said former application Sl. No. 575,467.

In accordance with our present invention, the different materials to be used for making the concrete lining for said ditch are delivered at some convenient up-stream point on the bank of said ditch or canal accessible by road, which may be designated generally by the circle B. As said ditch or canal may, and often does run through rough country very difficult of access, it will frequently be necessary to deliver the materials for making the lining, at a distance of several miles above the point at which said materials are to be used, and our improved process of transportation was devised for the purpose of providing simple and inexpensive means for conveying said materials from the up-stream point of delivery B to a down-stream point of use, which we will assume is that defined by the circle C.

In accordance with our improved system, the materials to be transported are loaded into boats, designated as a whole D, at the up-stream loading point B and are permitted to float down-stream to the point of discharge or use, the current flow in said ditch or canal being utilized for impelling the loaded boats.

As previously stated, our improved process contemplates the use of a sufficient number of boats D to insure an adequate and continuous supply of the different kinds of materials used.

Said boats are deposited into the water at the up-stream point of delivery of the materials, which may be designated the loading point, and when loaded, are cast adrift and permitted to float down the water-course with the current, without guidance and practically without attention on the part of operatives.

In order that said boats shall not become stranded or "hung up" on obstructions in the water-course A, said boats are so shaped that upon encountering an obstruction, they will execute a turning or rolling movement about a vertical axis, which will tend, in an obvious manner, to free or release them from said obstruction.

In what we now consider their preferable form, said boats are tub or bowl-shaped, being substantially circular in top plan view, the sides 1 thereof being upwardly and outwardly flared, and the bottom 2 thereof being outwardly and downwardly convex.

Said boats are preferably made of sheet metal of suitable thickness, to insure requisite strength, No. 12 gauge steel being sufficiently strong for usual purposes, the upper edges thereof being reinforced and strengthened by what may be called chimes 3, an effective form of chime consisting of a section of angle bar spot welded or otherwise rigidly secured to the upper edges of said boats and extending entirely around the same.

The size of said boats may vary according to conditions, and the character of materials to be transported, the controlling factor being the available depth of water in the ditch or canal.

Where there is a sufficient depth of water to permit their use, we contemplate the use of boats D, six feet six inches (6'-6") in diameter at the top, and about two feet eight inches (2'-8") in depth at the center, which will safely carry a load of one ton of cement, crushed rock or other relatively heavy material.

When the loaded boats arrive at the down-stream point of discharge or use, they, together with their contents, are lifted bodily from the water and are dumped at a desired place of deposit, where said materials will be conveniently available for use.

To provide for conveniently handling said boats, they are provided with lugs 4, preferably made of cast steel and secured in the angles of the chimes 3, in any suitable manner, as by rivets or spot welding. Said lugs are provided with eyes 5 adapted for making hoisting connections thereto, and comprise lugs arranged at different sides of said boats. As shown, said lugs comprise three lugs arranged at angles of 120 degrees from each other, and a fourth lug diametrically opposite one of the other lugs, thus providing for making connections to said lugs, either at three points arranged symmetrically around said transports or at diametrically opposite point.

With the construction described, it is obvious that if, in their progress down the ditch or canal, any of said boats encounters an obstruction it will, if the depth of water permits, execute a turning or rolling movement about a vertical axis, which will tend to cause said boat to automatically disengage or release itself from such obstruction and permit it to proceed on its way.

When they arrive at destination or point of discharge, the boats D together with their contents are lifted bodily from the water by means of a derrick or other suitable hoisting apparatus, attached to the hoisting cable of which are chains or the like, hooks on which are adapted to engage the eyes 5 in the lugs 4 on said boats, and the contents of said boats dumped at desired points of deposit.

To prevent the loaded transports from passing the unloading point or point of discharge, a swinging boom or other obstruction, not shown, may be secured across the ditch or canal, in position to arrest the further progress of said transports.

The contents of the boats D, having been dumped or discharged in the manner described, said boats are loaded upon a suitable vehicle, preferably a motor truck or the trailer of a tractor, and delivered to the up-stream loading point B where, in due course, they are again put into the water, loaded, and permitted to float down the ditch or canal, as before.

Flaring of the sides 1, of the boats D, not only renders them more stable when in the water, but also provides for nesting said boats one within another when transporting empty boats thus providing for conveniently loading a considerable number of said boats upon a motor truck or the like, when it is desired to transfer the same to the up-stream loading point. In order that the position of the boats on the truck or other vehicle may be stable, they will be loaded thereon in inverted or upside-down position, so as to rest upon their upper edges.

Obviously, when the boats D are loaded upon the truck or vehicle, the weight thereof will tend to wedge them together, so that there might be difficulty in separating them. To prevent this, said boats are provided with stops adapted to prevent them from becoming thus wedged together. In practice, these stops consist of the lugs 4, which are so positioned that the top edges of each upper boat, when nested, will rest upon the hoisting lugs 4 of the next lower boat, the relation, being such that very slight clearance will be provided between the sides of adjacent boats.

Owing to the rough and broken character of the country and the infrequent contact of roads with said ditches or canals, it sometimes happens that the points of discharge or use C will be inaccessible to motor vehicles. Under such conditions, it will be necessary, after the boats have been dumped or unloaded, to place the empty boats back into the ditch and permit them to float farther down-stream to some point which is accessible to a motor vehicle.

Also, in order to protect the contents of the boats from the weather, and to prevent them from becoming filled with water, wholly or partially, in case of rain during transit, which might cause them to sink, said boats will preferably be provided with covers 6 adapted to prevent access of water thereto.

We claim—

1. A boat for the purpose set forth consisting of a shallow bowl-shaped shell the circular wall of which flares upwardly and merges into a downwardly-convex bottom, and means on the exterior of the circular wall of the boat for making hoisting connections thereto.

2. A boat for the purpose set forth consisting of a shallow bowl-shaped shell the circular wall of which flares upwardly and merges into a downwardly-convex bottom, and means on the exterior of the circular wall of the boat for making hoisting connections thereto positioned so as to form stops to prevent wedging of one shell into another when nested.

3. A boat for the purpose set forth consisting of an imperforate shallow bowl-shaped shell whose circular wall flares upwardly and merges into a downwardly-convex bottom, and a removable rain-shedding cover for said boat, means being provided on the exterior of the circular wall of the boat for attaching a hoisting mechanism.

In testimony that we claim the foregoing as our invention, we have hereunto affixed our signatures the 21st day of November, 1922.

HARRY H. FISHER.
WALTER B. RITTENHOUSE.